Feb. 25, 1930. T. BACH ET AL 1,748,437
LID WITH SHEARS-LIKE GRIPPER
Filed Sept. 28, 1928
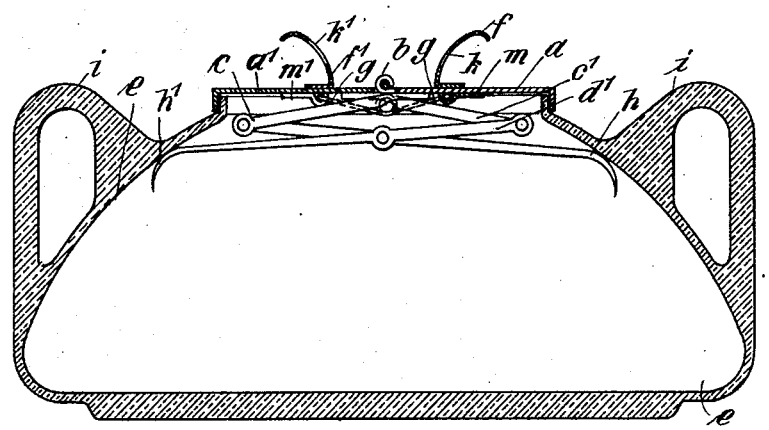
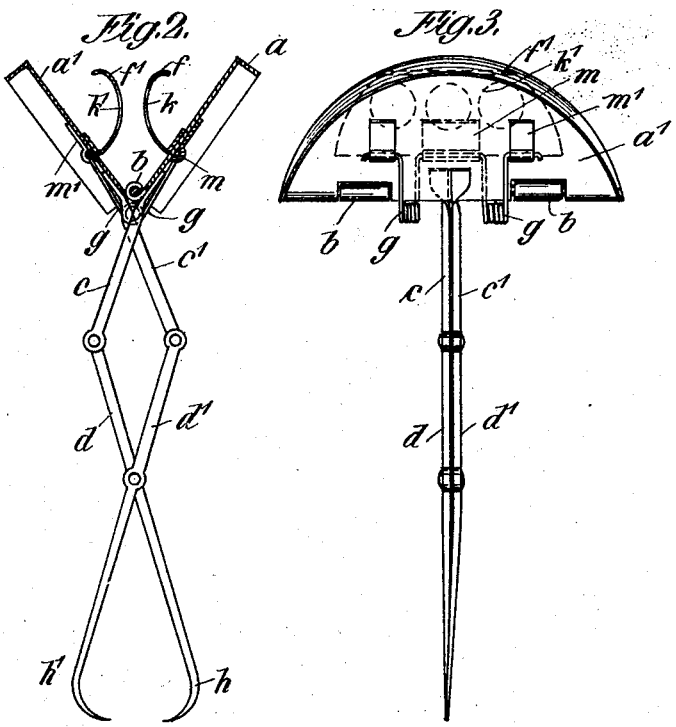

Patented Feb. 25, 1930

1,748,437

UNITED STATES PATENT OFFICE

THEODOR BACH AND JOSEF BIERSACK, OF MUNICH, GERMANY

LID WITH SHEARS-LIKE GRIPPER

Application filed September 28, 1928, Serial No. 308,910, and in Germany December 24, 1927.

This invention relates to a lid with shears-like gripper for containers, specially containers for victuals. Lids with shears-like gripper similar to lazy tongs are known, in which the gripper projects from the lid, the lid being made in one piece so that it forms a hindrance at the manipulation and prevents observation of the contents of the container.

According to the invention the lid consists of two hingedly connected parts having each a handle and being rigidly connected to the upper end of the shears-like gripper. These parts of the lid are held in stretched horizontal position by the action of springs.

When the lid is placed on the container the lower ends of the gripper are pressed by the action of the springs against the inner surface of the wall of the container, the lid being tightly pressed against the rim of the container. When the gripper is to be used for taking out any article from the container, the two parts of the lid are raised so that they form a handle for the gripper, the opening of the container being uncovered already before the lid is lifted.

An embodiment of the invention is illustrated, by way of example, in the accompanying drawing, in which Fig. 1 is a cross section through the container with lid.

Fig. 2 shows in side elevation, partly in section, the lid with the shears-like gripper.

Fig. 3 is a side elevation turned 90° with regard to Fig. 2.

The lid $a$, $a^1$ to be placed on a container $e$ of metal or glass carries on its lower side a shears-like gripper composed of hingedly connected levers $c$, $c^1$, $d$, $d^1$, and it is designed to remove from the container articles stored in the same, for instance rolls, so that they need not be touched with the hands.

The lid consists, according to the invention, of two halves $a$, $a^1$ connected with each other by a hinge $b$ and having each a handle $f$, $f^1$ respectively. To the lower surface of each half of the lid $a$, $a^1$ lever $c$, $c^1$ respectively is fixed, for instance by soldering as shown in Fig. 3. The lower levers $d$, $d^1$ of the gripper have inwardly curved pointed ends $h$, $h^1$ respectively designed to grip articles contained in the container. Instead of being hook-shaped as shown the ends $h$, $h^1$ may be spoon-shaped or cup-shaped.

The handles $f$, $f^1$ of the lid consist of sheet metal plates and have each an aperture $k$, $k^1$ respectively for the fingers of the hand which lifts the lid.

Under the hinge axle springs $g$ are arranged, the ends of which are fixed by means of sleeves $m$, $m^1$ to the lower surface of the halves $a$, $a^1$ of the lid and which maintain the lid in the stretched or horizontal position. The two parts $a$, $a^1$ of the lid are lifted with the aid of the handles $f$, $f^1$ in opposition to the action of the springs $g$. The shears-like gripper $c$, $c^1$, $d$, $d^1$ is stretched when the parts of the lid are being lifted so that the inwardly curved ends $h$, $h^1$ of the gripper grip one of the articles in the container.

To put the lid on, the shears-like gripper is inserted in stretched position into the container whereupon the handles $f$, $f^1$ are released so that the lid parts are lowered by the action of the springs $g$ and the hinged levers forming the gripper are pulled up as shown in Fig. 1. The lower levers $d$, $d^1$ hingedly connected with each other are of such length that their ends $h$, $h^1$ are pressed from below against the inner surface of the wall of the container, the lid being at the same time strongly pulled against the rim of the container.

We claim:—

The combination in a container, of a lid divided in two hingedly connected halves, and a lazy tongs gripper consisting of two pairs of hingedly connected levers, the upper ends of the upper pair of levers fixed on the lower surface of the corresponding halves of the lid, handles on the two lid-halves for raising said lid, said lazy tongs gripper being thereby extended by the lid-halves, and springs attached to said lid-halves for maintaining the same in stretched horizontal position and for pulling the gripper ends against the inner surface of the wall of the container and the lid strongly against the rim of the container when the lid is in closing position.

In testimony whereof we affix our signatures.

THEODOR BACH.
JOSEF BIERSACK.